(12) United States Patent
Perna et al.

(10) Patent No.: US 12,483,395 B2
(45) Date of Patent: Nov. 25, 2025

(54) METHOD FOR POLARIZATION ALIGNMENT

(71) Applicant: Quantum Optics Jena GmbH, Jena (DE)

(72) Inventors: Adrià Sansa Perna, Jena (DE); Alessandro Zannotti, Jena (DE); Oliver de Vries, Jena (DE)

(73) Assignee: Quantum Optics Jena GmbH, Jena (DE)

( * ) Notice: Subject to any disclaimer, the term of this patent is extended or adjusted under 35 U.S.C. 154(b) by 451 days.

(21) Appl. No.: 18/104,833

(22) Filed: Feb. 2, 2023

(65) Prior Publication Data

US 2023/0254131 A1 Aug. 10, 2023

(30) Foreign Application Priority Data

Feb. 9, 2022 (DE) ...................... 10 2022 103 012.1

(51) Int. Cl.
*H04L 9/08* (2006.01)
*H04B 10/70* (2013.01)

(52) U.S. Cl.
CPC .......... *H04L 9/0852* (2013.01); *H04B 10/70* (2013.01)

(58) Field of Classification Search
CPC .............................. H04B 10/70; H04L 9/0852
USPC ........................................................... 398/65
See application file for complete search history.

(56) References Cited

U.S. PATENT DOCUMENTS

| 6,873,783 | B1 | 3/2005 | Yao | |
|---|---|---|---|---|
| 7,315,665 | B1 | 1/2008 | Anderson | |
| 9,735,890 | B2 * | 8/2017 | Agarwal | H04J 1/08 |
| 11,451,308 | B1 * | 9/2022 | Bucklew | H04B 10/60 |
| 11,502,758 | B2 * | 11/2022 | Bucklew | H04B 10/6166 |

(Continued)

FOREIGN PATENT DOCUMENTS

| AU | 2021365730 A1 * | 2/2023 | ........... G02F 1/0136 |
|---|---|---|---|
| CN | 104780039 B * | 10/2017 | |

(Continued)

OTHER PUBLICATIONS

Christian et al; Quantum cryptography with highly entangled photons from semiconductor quantum dots ; Apr. 2021, Science Advances, pp. 1-8. (Year: 2021).*

(Continued)

*Primary Examiner* — Amritbir K Sandhu
(74) *Attorney, Agent, or Firm* — Hoffmann & Baron, LLP (57) ABSTRACT

A method for polarization alignment, preferably for and/or in the case of optical communication, quantum cryptography and/or quantum computing, comprising a source (2) for generating polarization-entangled photon pairs and two detection modules (3, 4), wherein the source (2) for transmitting the photons is connected via in each case one quantum channel (5) to the two detection modules, and wherein each detection module measures the polarization of the photons in two non-orthogonal bases, and including a polarization compensation unit (6) for polarization alignment of the polarization change during the transmission of the photons via the quantum channels, wherein the polarization compensation unit (6) has several optical components. The polarization alignment is effected by a downhill simplex algorithm and/or by a deterministic algorithm.

14 Claims, 2 Drawing Sheets

(56) References Cited

U.S. PATENT DOCUMENTS

| | | | |
|---|---|---|---|
| 2010/0315640 A1* | 12/2010 | Webb | H04B 10/2569 |
| | | | 356/364 |
| 2012/0087500 A1* | 4/2012 | Ukita | H04L 9/0858 |
| | | | 380/256 |
| 2013/0083925 A1* | 4/2013 | Nordholt | H04L 9/0858 |
| | | | 380/256 |

FOREIGN PATENT DOCUMENTS

| | | | | | |
|---|---|---|---|---|---|
| CN | 105337730 B | * | 8/2018 | ........... | H04L 9/0858 |
| EP | 4178123 A1 | * | 5/2023 | ........... | H04L 9/0858 |
| JP | 2022182993 A | * | 12/2022 | ........... | H04L 9/0858 |

OTHER PUBLICATIONS

Jeong et al; Deterministic Secure Quantum Communication on the BB84 System ; Nov. 2020; MDPI, pp. 1-13. (Year: 2020).*
Hübel, H. u.a.: High-fidelity transmission of polarization encoded qubits from an entangled source over 100 km of fiber. In: Optics Express. 2007, vol. 15, No. 12, S. 7853-7862.
Wikipedia: Downhill-Simplex-Verfahren. URL: https://de.wikipedia.org/wiki/Downhill-Simplex-Verfahren, Archiviert in https://web.archive.org am Apr. 17, 2021 [abgerufen am Nov. 25, 2022].
German Examination Report of Nov. 25, 2022.

* cited by examiner

METHOD FOR POLARIZATION ALIGNMENT

BACKGROUND OF THE INVENTION

The invention relates to a method for polarization alignment according to the features of the preamble of claim 1 and a device for polarization alignment.

In the case of optical communication, quantum cryptography and/or quantum computing, it is important that the source and one or more recipients use the same polarization base lines, also called bases in the following, when polarization-entangled photon pairs are used. However, during the transmission of the photons in a medium by birefringence, for example in a fiber or in the atmosphere, an unknown polarization rotation occurs, which must be compensated for by optical components for the polarization alignment in order to make optical communication, quantum cryptography and/or quantum computing possible.

Methods and devices for polarization alignment are already known, wherein the best-known optical components for polarization alignment include rotatable wave plates, fiber squeezers or fiber paddles. In order to carry out a polarization alignment during the transmission of photons in a fiber, in known methods two non-orthogonal bases, i.e. two degenerate bases, are for example predefined by a rotatable polarizer and these two non-orthogonal bases and the settings of the optical components are determined by heuristic adjustment methods (trial and error), under which a polarization alignment is obtained. In these heuristic or stochastic methods the adjustment or the polarization alignment is effected using a random change of the settings of the optical components and comparison of the measured values obtained thereby with previous measured values, wherein in the case of an improvement of the measured values the adjustment is continued in this direction and in the case of a deterioration of the measured values the preceding adjustment position is restored. Such adjustment methods are time-consuming and imprecise, but can be carried out using simple and cost-effective optical components.

SUMMARY OF THE INVENTION

The object of the present invention is to provide an improved, more precise and quicker method and a corresponding device for polarization alignment.

The object is achieved according to the invention by a method for polarization alignment according to the features of claim 1.

According to the invention, a method for polarization alignment is proposed, preferably for and/or in the case of optical communication, quantum cryptography and/or quantum computing, comprising a source for generating polarization-entangled photon pairs and two detection modules, wherein the source is connected via in each case one quantum channel for transmitting the photons to the two detection modules, and wherein each detection module measures the polarization of the photons in two non-orthogonal bases, and comprising a polarization compensation unit for polarization alignment of the polarization change during the transmission of the photons via the quantum channels, wherein the polarization compensation unit comprises several optical components.

It is important here that the polarization alignment is effected by a downhill simplex algorithm and/or by a deterministic algorithm, wherein, for the downhill simplex algorithm, control parameters are measured in the detection modules at different settings of the optical components, and using the downhill simplex algorithm the control parameters are minimized and/or maximized, and the optical components are set by the minimization and/or maximization of the control parameters by the downhill simplex algorithm, in order to align the polarization change during the transmission of the photons via the quantum channels, and/or, for the deterministic algorithm, control parameters are measured in the detection modules at different settings of the optical components, wherein the different settings of the optical components are predefined by the deterministic algorithm, and using the measurements the settings of the optical components for polarization alignment are calculated by the deterministic algorithm, and the optical components are set using the deterministic algorithm, in order to align the polarization change during the transmission of the photons via the quantum channels.

Further, the object is achieved proposed by a device for polarization alignment, preferably for use for optical communication, quantum cryptography and/or quantum computing according to the present invention.

According to the invention, a device for polarization alignment is proposed, preferably for use for optical communication, quantum cryptography and/or quantum computing, wherein the device has a source, two detection modules and a polarization compensation unit, and wherein the source generates polarization-entangled photon pairs, and wherein each detection module measures the polarization of the photons in two non-orthogonal bases, and wherein, for the transmission of the photons, each detection module is connected via a quantum channel to the source.

It is important here that the polarization compensation unit comprises at least three optical components, in order to align the polarization change during the transmission of the photons via the quantum channels, wherein the optical components are formed as liquid-crystal retardation plates and/or fiber squeezers, and that the liquid-crystal retardation plates and/or fiber squeezers are arranged before and/or in each case in one detection module, or are arranged in the source before one or allocated before both quantum channels, or are arranged in each case in one quantum channel, or are arranged allocated to both quantum channels and/or detection modules.

The combination of the two algorithms combines the advantages of the two algorithms, i.e. a quick first adjustment of the system is thereby possible and the stabilization of the system can be carried out during the ongoing communication process. A stabilization of the system during the ongoing communication process is necessary as, over the course of time, for example due to temperature fluctuations, a change in the unknown polarization rotation in the fibers can arise.

The advantage of the downhill simplex algorithm (also called Nelder-Mead algorithm) is that it is a local non-linear optimization without constraint and the algorithm manages without derivatives, as a result of which a simple and quick polarization alignment is possible. The advantage of the downhill simplex algorithm is further that a first adjustment of the system can be effected using this algorithm and the downhill simplex algorithm can also be carried out during the optical communication, quantum cryptography and/or quantum computing, in order to keep the system stable, for example during the key generation.

The advantage of the deterministic algorithm is that the first adjustment of the system can be carried out very quickly and precisely using the measurements, calculations and settings predefined by the deterministic algorithm.

Deterministic algorithm here means that the polarization change during the transmission of the photons is determined using set measurements, predefined by the deterministic algorithm, and the polarization compensation unit is set by the deterministic algorithm using the measured control parameters, in order to make an optical communication, quantum cryptography and/or quantum computing between the two detection modules possible. The deterministic algorithm thus predefines the settings of the polarization compensation unit under which the measurements of the control parameters are carried out, specifies the mathematical correlations under which the polarization alignment is calculated using the measurement results and sets the polarization compensation unit corresponding to the calculation, in order to obtain a polarization alignment. The adjustment by the deterministic algorithm fundamentally differs from a heuristic adjustment method (trial and error) through the predefined settings of the optical components for the measurements of the control parameters and the calculation of the polarization alignment using the mathematical correlations.

In the case of the application according to the invention of the downhill simplex algorithm and/or of the deterministic algorithm for polarization alignment with entangled photon pairs and the device according to the invention, the polarization alignment is effected such that the orientation of the bases of the two detection modules is matched to each other. Through the method according to the invention and the device according to the invention, it is not necessary to know the exact orientation of the bases in general space, it is only necessary for both bases to be oriented in the same way. This means that, for the polarization alignment, through the method according to the invention and the device according to the invention no fixed bases are predefined, i.e. for example generated by a polarizer in the source.

In the case of the method according to the invention and the device according to the invention with polarization-entangled photon pairs, it is important for optical communication, quantum cryptography and/or quantum computing that the bases of the two detection modules are oriented in the same way in general space. The exact orientation of the bases in general space can remain unknown through the use of control parameters based on the polarization-entangled photon pairs. The advantage of the method according to the invention and the device according to the invention lies in the use of entangled photons for the polarization alignment, whereby the source need not emit photons with known polarization for the polarization alignment of the two recipients. It is thereby possible already to obtain valid bits for the optical communication, quantum cryptography and/or quantum computing during the alignment, for example at a quantum bit error rate (QBER)≤11%.

For the polarization alignment in the case of optical communication, quantum cryptography and/or quantum computing, it is necessary to align at least two non-orthogonal bases, in order to compensate for an undesired polarization rotation for any polarization. By two non-orthogonal polarization bases is meant here that, if a system generates a photon in a state of the first basis and measures the photon in the second basis, each measurement result of this second basis can be obtained with the same probability. An example of two non-orthogonal polarization bases, so-called mutually unbiased bases, are the H/V and the D/A basis, where H stands for linear horizontal polarization, V stands for linear vertical polarization, D stands for linear 45° polarization, and A stands for linear −45° polarization. The R/L basis as a non-orthogonal basis represents a further example of so-called mutually unbiased bases to the H/V and D/A bases, wherein R stands for right-handed circular polarization and L stands for left-handed circular polarization. Bases with elliptical polarization can also be used as non-orthogonal polarization bases. It should be noted here that, for example in the representation of the polarization of the states in the Poincaré sphere, the H/V and D/A bases are arranged at right angles to each other.

In the method for polarization alignment, it can be provided that the polarization compensation unit comprises at least three optical components. In the method for polarization alignment, it can be provided that the optical components of the polarization compensation unit are formed as liquid-crystal retardation plates and/or as fiber squeezers.

In the method using the downhill simplex algorithm and/or deterministic algorithm, it can be provided that, as control parameters, the coincidences of the photon pairs are determined and/or the visibility of the photon pairs and/or the fidelity of the photon pairs and/or the rate at which a common key is generated and/or the quantum bit error rate (QBER), or modifications based on such values. It can be provided that, for example for reasons of symmetry, there are several optimal values (minima and/or maxima) of the control parameters in the polarization alignment, wherein, through the downhill simplex algorithm and/or deterministic algorithm, randomly or in a targeted manner one of the optimal values is then utilized for the polarization alignment. Further, whether this is minimized or maximized depends on the control parameter used, wherein for example the quantum bit error rate (QBER) can be minimized and for example the visibility can be maximized.

In the method using the downhill simplex algorithm and/or deterministic algorithm, it can be provided that the settings of the liquid-crystal retardation plates as part of the polarization compensation unit for measuring the control parameters is the retardation d (delay) and/or the voltage applied to one or more of the liquid-crystal retardation plates. Through a change in the voltage applied to one of the liquid-crystal retardation plates, the retardation d (delay) between the fast and slow optical axes is continuously altered depending on the strength of the applied voltage.

In the method using the downhill simplex algorithm and/or deterministic algorithm, it can be provided that the settings of the fiber squeezers as part of the polarization compensation unit for measuring the control parameters is the retardation d (delay), and/or degree of squeezing, and/or degree of birefringence, and/or the voltage applied to one or more of the fiber squeezers. Through a change in the degree of squeezing, and/or the voltage applied to one of the fiber squeezers, the retardation d (delay) between the fast and slow optical axes and/or the birefringence is continuously altered depending on the strength of the applied voltage and/or squeezing.

In the method and/or the device, it can be provided that the liquid-crystal retardation plates and/or fiber squeezers make a retardation d of 0 and $2\pi$ possible, preferably a retardation d of 0 and $>2\pi$, most preferably of 0 and $>4\pi$. It can be provided that the voltage for the retardation d of 0 and $2\pi$ for the liquid-crystal retardation plates and/or fiber squeezers is known. It can be provided that the voltage for the retardation d of 0 and $>2\pi$, preferably of 0 and $>4\pi$ for the liquid-crystal retardation plates and/or fiber squeezers is known. The advantage of a retardation d of 0 and $>2\pi$ lies in the recurring behavior (modulo) of the optical components during the retardation. The required voltage for a retardation d by $2\pi$, i.e. $2\pi-x\equiv0-x$ and $2\pi+x\equiv0+x$, can for example be utilized in order to achieve such retardation jumps with small voltage changes.

In the method using the downhill simplex algorithm and/or deterministic algorithm, it can be provided that the control parameters squared, or control parameters$^3$, or control parameters$^x$, where x=1, . . . , n with n as a real number, are used. The advantage of such an algorithm i) lies in the quicker polarization alignment, as a quicker convergence is obtained.

In the method and/or the device, it can be provided that the control parameter is determined by a measurement over a time interval. It can be provided that the time interval for determining the control parameters depends on the number of detected coincidences of the entangled photon pairs. It can be provided that the time interval is so large that up to >100 coincidences are detected, preferably >1000 coincidences, most preferably >5000 coincidences.

It can be provided that the fast axes of the liquid-crystal retardation plates and/or the fiber squeezers are arranged with respect to each other in such a way that the first and second liquid-crystal retardation plates and/or fiber squeezers influence the first basis and the second basis if the voltage of the first or second liquid-crystal retardation plate and/or the fiber squeezers is changed, and that the third liquid-crystal retardation plate and/or fiber squeezer influences only the second basis if the voltage of the third liquid-crystal retardation plate and/or the fiber squeezer is changed. The first and the second bases are formed non-orthogonal with respect to each other. This is possible for example if the fast axes of the first and the third liquid-crystal retardation plates are arranged at 0° or at 90° with respect to each other, and if the first and the second liquid-crystal retardation plates are arranged at 45° or −45° with respect to each other. 0° means for example an arrangement of the fast axis relative to the horizontal linear polarization of a polarizing beam splitter before a detector in the detection module.

In the following, the downhill simplex algorithm and various embodiments of the deterministic algorithm are discussed in detail, wherein fiber squeezers can also be used instead of the liquid-crystal retardation plates. All or only individual liquid-crystal retardation plates can be replaced by fiber squeezers. Further, it is possible in the following that any desired value can be used in the case of values of the settings that are not specifically indicated. The specific values can have actual values or value ranges.

It can be provided that the method using the downhill simplex algorithm is effected before and/or during the key generation with entangled photons in the case of quantum cryptography (QKD). It can be provided that the method using the deterministic algorithm is effected before the key generation with entangled photons in the case of quantum cryptography (QKD). The key generation with entangled photons in the case of quantum cryptography (QKD) is effected in several steps. First, in the key exchange step, which is also called raw key generation, the polarization-entangled photons are generated in the source and in each case one photon of a pair is transferred to in each case one recipient (detection modules) and the polarization of the entangled photon pairs is measured, wherein each measurement is effected randomly in a basis consisting of two non-orthogonal bases. The results of the measurement as well as the basis in which the respective recipient has measured are kept secret in this step. In the second step, called key sifting, only the results of the measurements in which the two recipients have measured in the same basis are retained, i.e. the bases in which measurement was effected are openly communicated in this step. Through this selection the so-called sifted key is obtained. After this, the so-called key distillation step is effected, which can for example include error correction of the sifted key, privacy amplification and for example also an authentication of the recipients.

It can be provided that, during error correction in the case of quantum cryptography (QKD), the content of the detected incorrect portions is exchanged and the content of these portions is utilized, together with the number of non-incorrect portions, for the polarization alignment. This method using the downhill simplex algorithm is preferably carried out before or during the key generation with entangled photons in the case of quantum cryptography (QKD). The content of the incorrect portions together with the number of non-incorrect portions can be used to determine the control parameter. Using such a method, the coincidences, the visibility, the fidelity and/or the quantum bit error rate (QBER), which are obtained during the key generation of a quantum cryptography (QKD) protocol, can be utilized as control parameters. The advantage of such a method is that only control parameters which can be determined by the components which are utilized in a quantum cryptography method are used.

It can be provided that the downhill simplex algorithm uses measured values arising during the key generation as control parameters for the polarization alignment. The advantage of using the downhill simplex algorithm with measured values arising during the key generation as control parameters is that it can be utilized during the key generation in the case of quantum cryptography, and that in addition no separate adjustment phase before the key generation is necessary and no further optical components are necessary for determining the control parameters. No separate adjustment phase here means that the key generation is carried out analogously to a quantum cryptography protocol, even if a polarization alignment has not yet been effected. However, it is important that the bits obtained in the quantum cryptography protocol are only regarded as secure when for example a quantum bit error rate (QBER) of ≤11% is obtained through the polarization alignment by the downhill simplex algorithm. Areas which have a quantum bit error rate (QBER) of >11% during the key generation are discarded.

When the downhill simplex algorithm is used, it can be provided that the voltage of a retardation by $2\pi$ is known for every liquid-crystal retardation plate. A retardation d by $2\pi$ corresponds to a delay by a full wavelength. The advantage of the method according to the invention and the device according to the invention is that no further calibration, such as for example of the temperature dependence of the liquid-crystal retardation plates, which satisfy two voltage values 0 and $2\pi$, is necessary.

It can be provided that the downhill simplex algorithm minimizes and/or maximizes the control parameter depending on the retardation d (delay) and/or the voltage of the liquid-crystal retardation plates.

It can be provided that the downhill simplex algorithm has, for the minimization (convergence), in each step, in each case at least four measurement points, in order to span a three-dimensional control parameter space, a so-called simplex. The volume of the simplex or the distance of the individual measurement points which span the simplex from each other or from a common reference point (e.g. central point), can be considered as a measure of the convergence, i.e. the polarization alignment. It can be provided that the downhill simplex algorithm, for each further step, reduces the volume of the simplex, or the distance of the individual measurement points which span the simplex from each other or from a common reference point (e.g. central point), with respect to the preceding step. The convergence is achieved by carrying out a new measurement by which the volume of the simplex, or the distance of the individual measurement points which span the simplex from each other or from a common reference point (e.g. central point), is reduced with respect to the preceding step and an old measurement point is replaced by the new measurement for the calculation of the simplex, in order to converge. It can be provided that several measurements are carried out in order to obtain a measurement point which allows the simplex to converge.

It can be provided that the control parameter for the downhill simplex algorithm has a limit value, from which the further minimization (convergence) is prevented. The advantage of such a limit value is that the downhill simplex algorithm is better able to react to temporal changes in the polarization changes. For this, the downhill simplex algorithm prevents the further shrinkage of the simplex during the convergence from the point a limit value is reached. If the simplex volume were approximately zero or very small, the algorithm can no longer expand the simplex and the points being spanned can no longer move or it is only after a very large number of steps that a corresponding expansion is possible. Due to the limit value, the downhill simplex algorithm is always able to maneuver out of the minimum not quite reached and thus to react to a temporal change in the polarization changes.

It can be provided that the quantum bit error rate (QBER) ≤11% is regarded as a limit value. The advantage of this limit value is that a secure key can be generated at such a quantum bit error rate. At a quantum bit error rate above this limit value, the quantum bit error rate is used as control parameter for the polarization alignment, but no key is generated therefrom.

It can be provided that the deterministic algorithm for measuring the control parameters predefines fixed values and/or value ranges for the different settings of the optical components. For example, a particular retardation dx (delay) can be predefined as a value or, for example for a value range, the retardation d (delay) can be predefined over a range from 0+x to 2π−x.

It can be provided that the deterministic algorithm, preferably in a first embodiment i), second embodiment ii) and/or third embodiment iii), is based on a relationship of the control parameter to the retardation d in the form of a sin(d+b)+c, preferably a relationship of the control parameter to the retardation d in the form of a sin(d+b)+c, in the case of a change in the voltage of only one optical component, with a, b, c as fit parameters. The control parameter here can for example be the coincidences of the entangled photon pairs, or a value which is based on the coincidences of the entangled photon pairs. a corresponds to the amplitude, b corresponds to the phase, and c corresponds to the offset of the sine function. The advantage of the first embodiment i), second embodiment ii), and third embodiment iii) of the deterministic algorithm lies in the fixed number of measured values which are necessary and are predefined by the respective embodiment in order to calculate the retardation for the polarization alignment through the sinusoidal relationship of the control parameter.

It can be provided that the control parameter for the deterministic algorithm in its first embodiment i), second embodiment ii) and/or third embodiment iii) is the coincidences and/or the visibility, and/or the quantum bit error rate (QBER), and/or the fidelity of the entangled photon pairs, or is values based thereon.

It can be provided that, in the case of the deterministic algorithm in its first embodiment i), second embodiment ii) and/or third embodiment iii), first the polarization alignment is effected in a first basis through an optimization of the retardation of the first and the second liquid-crystal retardation plates and then the polarization alignment is effected in a second basis through an optimization of the retardation of the third liquid-crystal retardation plates.

In the following first, second and third embodiments of the deterministic algorithm described in detail, the optical axes of the first, second and third liquid-crystal retardation plates are arranged, by way of example, at the angles 0°, 45° and 0° with respect to each other.

It can be provided that, for the polarization alignment in the first embodiment i) of the deterministic algorithm, the following measurements are carried out and the settings for the polarization alignment are determined as follows:

Optimization of the retardation $d_{2opt}$ of the second liquid-crystal retardation plates by
1. at least three measurements of the control parameter C in a first basis at any desired fixed value $d_{2i}$ of the second liquid-crystal retardation plate in each case at different retardation $d_{1x}$ of the first liquid-crystal retardation plate (with x=3, . . . , n and n as a natural number), and determining the fit parameters a, b, c where $C_{d_1}$=a sin($d_1$+b)+c at $d_{2i}$ and $d_3$=0, and determining the maximum coincidences at the values used in the first basis by $K_{max}(d_{2i})=|a|+c$;
2. carrying out the measurements 1. for two further values $d_{2ii}$ and $d_{2iii}$ and determining the values $K_{max}(d_{2ii})$ and $K_{max}(d_{2iii})$ analogously to 1.;
3. determining the fit parameters A, B, C by $$K_{max}(d_{2y}) = A\left(\sin\left(|d_{2y} - \pi| - B\frac{\pi}{2}\right)\right) + C$$

(where y=i, ii, iii) using the values $K_{max}(d_{2i})$, $K_{max}(d_{2ii})$, $K_{max}(d_{2iii})$ and determining $d_{2opt}$ at which the coincidences in the first basis are at a maximum by $$K_{max}(d_{2opt}) = A\left(\sin\left(|d_{2opt} - \pi| - B\frac{\pi}{2}\right)\right) + C$$

4. setting the retardation $d_{2opt}$ of the second liquid-crystal retardation plate.

Optimization of the retardation $d_{1opt}$ of the first liquid-crystal retardation plates by
1. at least three measurements of the control parameter C in the first basis in each case at different retardation $d_{1x}$ of the first liquid-crystal retardation plate and the values $d_2=d_{2opt}$ and $d_3=0$;
2. determining $d_{1opt}$ at which the coincidences in the first basis are at a maximum by $C_{d_{1opt}}$=a sin($d_{1opt}$+b)+c;
3. setting the retardation $d_{1opt}$ of the first liquid-crystal retardation plate.

Optimization of the retardation $d_{3opt}$ of the third liquid-crystal retardation plates by
  1. at least three measurements of the control parameter C in a second basis in each case at different retardation $d_{3x}$ and the values $d_1=d_{1opt}$ and $d_2=d_{2opt}$
  2. determining $d_{3opt}$ at which the coincidences in the second basis are at a maximum by $C_{d_{3opt}}=a\sin(d_{3opt}+b)+c$;
  3. setting the retardation $d_{3opt}$ of the first liquid-crystal retardation plate.

Or

Optimization of the retardation $d_{3opt}$ of the third liquid-crystal retardation plates by
  1. at least one measurement of the control parameter, preferably of the fidelity as control parameter, at the values $d_1=d_{1opt}$ and $d_2=d_{2opt}$ and $d_3=0$
  2. determining $d_{3opt}$ where $$d_{3opt} = -\cos^{-1}\frac{F(d_{1opt}, d_{2opt}, 0) - 0.5}{0.5},$$

as, for $d_{1opt}$, $d_{2opt}$, $d_3$, $F(d_{1opt}, d_{2opt}, d_3)=0.5\cos(d_3-C)+0.5$, wherein $d_{3opt}=-d_{3opt}$ if $F(d_{1opt}, d_{2opt}, d_{3opt})=0$
  3. setting the retardation $d_{3opt}$ of the first liquid-crystal retardation plate.

It can be provided that, for the polarization alignment in the second embodiment ii) of the deterministic algorithm, the following measurements are carried out and the settings for the polarization alignment are determined as follows:

Optimization of the retardation $d_{1opt}$ of the first liquid-crystal retardation plates and $d_{2opt}$ of the second liquid-crystal retardation plates by
  1. $n\geq2$ measurements of the control parameter with n as a natural number, preferably of the coincidences in the first basis as control parameter, depending on the retardations $d_{1_n}$ and $d_{2_n}$ where $d_1\neq d_2$ in the case of at least one measurement with different retardation $d_{1_n}$ and/or $d_{2_n}$ for each measurement;
  2. fitting the equation $$HH(d_1, d_2) = A\sin(d_2)\cos(d_1-B)\pm\sqrt{\left(\frac{HH_{max}}{2}\right)^2 - A^2}\cos(d_2) + \frac{HH_{max}}{2} \text{ where } HH_{max} =$$

$$HH + HV \text{ if } HH = VV,$$

or where $$HH_{max} = \frac{HH + VV + HV + VH}{2}$$

and with the parameter $A<HH_{max}/2$ for determining the parameters A and B for determining $d_{1opt}$ and $d_{2opt}$ where $d_{1opt}=B$ and $$d_{2opt} = \pm\tan^{-1}\frac{A}{\sqrt{\frac{HH_{max}^2}{2} - A^2}}, \text{ where } + \text{ if } HH(0.0) > \frac{HH_{max}}{2}$$

and—otherwise, wherein $d_{2opt}=d_{2opt}+\pi$ if $HH=0$.
  3. setting the retardation $d_{1opt}$ of the first liquid-crystal retardation plate.

Optimization of the retardation $d_{3opt}$ of the third liquid-crystal retardation plates by
  1. at least three measurements of the control parameter C in a second basis in each case at different retardation $d_{3x}$ and the values $d_1=d_{1opt}$ and $d_2=d_{2opt}$
  2. determining $d_{3opt}$ at which the coincidences in the second basis are at a maximum by $C_{d_{3opt}}=a\sin(d_{3opt}+b)+c$;
  3. setting the retardation $d_{3opt}$ of the first liquid-crystal retardation plate.

Or

Optimization of the retardation $d_{3opt}$ of the third liquid-crystal retardation plates by
  1. at least one measurement of the control parameter, preferably of the fidelity as control parameter, at the values $d_1=d_{1opt}$ and $d_2=d_{2opt}$ and $d_3=0$
  2. determining $d_{3opt}$ where $$d_{3opt} = -\cos^{-1}\frac{F(d_{1opt}, d_{2opt}, 0) - 0.5}{0.5},$$

as, for $d_{1opt}$, $d_{2opt}$, $d_3$, $F(d_{1opt}, d_{2opt}, d_3)=0.5\cos(d_3-C)+0.5$, wherein $d_{3opt}=-d_{3opt}$ if $F(d_{1opt}, d_{2opt}, d_{3opt})=0$
  3. setting the retardation $d_{3opt}$ of the first liquid-crystal retardation plate.

It can be provided that, for the polarization alignment in the second embodiment ii) of the deterministic algorithm, the fit is effected by a non-linear method, preferably is effected by the non-linear least square fit.

It can be provided that, for the polarization alignment in the second embodiment ii) of the deterministic algorithm, only two measurements of the control parameter are carried out or that more than two measurements of the control parameter are carried out. The advantage of only two measurements is that the polarization alignment can be carried out extremely quickly. The advantage of more than two measurements is that the polarization alignment makes a precise polarization alignment possible in a simple manner even in the case of noisy systems.

It can be provided that, for the polarization alignment in the third embodiment iii) of the deterministic algorithm, the following measurements are carried out and the settings for the polarization alignment are determined as follows:

Optimization of the retardation $d_{1opt}$ of the first liquid-crystal retardation plate by
  1. two or three measurements of the control parameter C in a first basis, preferably of the coincidences in the first basis ($HH(d_1, d_2)$) as control parameter with the values $$HH(0, d_2) = P_1, HH\left(\frac{\pi}{2}, d_2\right) = P_2,$$

and $HH(\pi, d_2)=P_3$ with any desired $d_2$, with $0<d_2<\pi$ and any desired $d_3$, for example where $$HH(d_1, d_2) = A\sin(d_2)\cos(d_1-B)\pm\sqrt{\left(\frac{HH_{max}}{2}\right)^2 - A^2}\cos(d_2) + \frac{HH_{max}}{2},$$

wherein for $d_2 = \frac{\pi}{2}(2n+1)$ only two measurements are carried out.

2. determining $d_{1_{opt}}$ in the case of three measurements where $$d_{1_{opt}} = \tan^{-1} \frac{P_2 - \frac{P_1 + P_3}{2}}{P_1 - \frac{P_1 + P_3}{2}},$$

wherein $d_{1_{opt}} = d_{1_{opt}} + \pi$, if $P_1 < P_3$, or in the case of only two measurements $$d_{1_{opt}} = -\sin^{-1} \frac{\pm P_o}{\sqrt{p_0^2 + p_1^2}} \pm \frac{3}{2}\pi,$$

wherein "+" is utilized at $P_1 > 0$ and "−" is utilized at $P_1 < 0$.

3. setting the retardation $d_{1_{opt}}$ of the first liquid-crystal retardation plate.

Optimization of the retardation $d_{2_{opt}}$ of the second liquid-crystal retardation plate by 1. one measurement of the control parameter C in a first basis, preferably of the coincidences $HH(d_1, d_2)$ as control parameter with the values $d_{1_{opt}}$ and any desired $d_2$ where for example $d_2=0$ in order to obtain the measured value $P_4=HH(d_{1_{opt}}, d_2=0)$;

2. determining $d_{2_{opt}}$ by $$HH(d_{1_{opt}}, d_2) = \frac{HH_{max}}{2}\cos(d_2 - d_{2_{opt}}) + \frac{HH_{max}}{2} \text{ where } HH_{max} = HH + HV$$

if HH=VV, or where $$HH_{max} = \frac{HH + VV + HV + VH}{2} \text{ where } d_{2_{opt}} = \cos^{-1}\frac{P_4 - \frac{HH_{max}}{2}}{\frac{HH_{max}}{2}} \text{ for } d_2 = 0,$$

$$\text{or where } d_{2_{opt}} = \cos^{-1}\frac{P_4 - \frac{HH_{max}}{2}}{\frac{HH_{max}}{2}} + d_{2_{set}}d_{2_{opt}} = \ldots \text{ for } d_2 \neq 0;$$

3. setting the retardation $d_{2_{opt}}$ of the first liquid-crystal retardation plate.

Optimization of the retardation $d_{3_{opt}}$ of the third liquid-crystal retardation plate by 1. at least three measurements of the control parameter C in a second basis in each case at different retardation $d_{3x}$ and the values $d_1=d_{1_{opt}}$ and $d_2=d_{2_{opt}}$ 2. determining $d_{3_{opt}}$, at which the visibility in the second basis is at a maximum by $C_{d_{3opt}}=a \sin(d_{3_{opt}}+b)+c$;

3. setting the retardation $d_{3_{opt}}$ of the first liquid-crystal retardation plate.

or

Optimization of the retardation $d_{3_{opt}}$ of the third liquid-crystal retardation plate by 1. at least one measurement of the control parameter, preferably of the fidelity as control parameter, at the values $d_1=d_{1_{opt}}$ and $d_2=d_{2_{opt}}$ and $d_3=0$ 2. determining $d_{3_{opt}}$ where $$d_{3_{opt}} = -\cos^{-1}\frac{F(d_{1_{opt}}, d_{2_{opt}}, 0) - 0.5}{0.5},$$

as, for $d_{1_{opt}}$, $d_{2_{opt}}$, $d_3$, $F(d_{1_{opt}}, d_{2_{opt}}, d_3)=0.5 \cos(d_3-C)+0.5$, wherein $d_{3_{opt}}=-d_{3_{opt}}$ if $F(d_{1_{opt}}, d_{2_{opt}}, d_{3_{opt}})=0$ 3. setting the retardation $d_{3_{opt}}$ of the first liquid-crystal retardation plate.

It can be provided that, for the polarization alignment in the second embodiment ii) and/or the third embodiment iii) of the deterministic algorithm, the control parameter is corrected with respect to random detection results, which are for example caused by the measurement of coincidences based on non-entangled photon pairs (accidental coincidences). It can be provided that the correction of the random detection results by an additional parameter D during the optimization of the retardation $d_{3_{opt}}$ of the third liquid-crystal retardation plates is compensated for by $$F(d_{1_{opt}}, d_{2_{opt}}, d_3) = \frac{1-D}{2}\cos(d_3 - C) + D$$

where D>0. D here is the value of the control parameter which results for example due to no polarization-entangled photon pair (accidental coincidences) and/or due to an imperfect entangled photon source.

It can be provided that, after the polarization alignment using the first embodiment i), second embodiment ii) and/or third embodiment iii) of the deterministic algorithm, the quantum bit error rate (QBER) is measured, and at a quantum bit error rate (QBER)≤11% the optical communication, quantum cryptography and/or quantum computing is carried out securely, or at a quantum bit error rate (QBER) >11% the optical communication, quantum cryptography and/or quantum computing is not carried out. The advantage of the first embodiment i), second embodiment ii) and/or third embodiment iii) of the deterministic algorithm is that, after carrying out the polarization alignment using the deterministic algorithm, it can be ascertained whether the system is corrupted in that, after the polarization alignment, the quantum bit error rate (QBER) is measured and, using the result, the system can be classified as secure or as corrupted. The measurement of the quantum bit error rate (QBER) is preferably carried out shortly after carrying out the polarization alignment.

It can be provided that, during the optimization of the retardation of the first and/or second, and or third liquid-crystal retardation plates, several measurements are carried out or the measurements are averaged over a longer period. It can be provided that the number of measurements and/or the period depends on the coincidences detected. It can be provided that the measurements are carried out and/or the time interval is so large that up to >100 coincidences were detected, preferably >1000 coincidences, most preferably >5000 coincidences. The advantage of such an embodiment increases the accuracy of the polarization alignment.

It can be provided that, after the polarization alignment using the deterministic algorithm, preferably in its first embodiment i), second embodiment ii) and/or third embodiment iii), a heuristic adjustment method is used for the permanent stabilization of the system. It can be provided that only ever one optical component is adjusted in succession. It can be provided that only the optical component the control parameter of which falls below or exceeds a limit value is adjusted. For example, only the third optical component is adjusted if for example the visibility in the D/A basis as control parameter falls below the limit value, e.g. 95%.

Preferably, only this optical component for which the control parameter is fallen below and/or exceeded.

It can be provided that the polarization alignment is effected by one or more of the previously named deterministic algorithms.

It can be provided that the source for generating polarization-entangled photon pairs has one or more non-linear elements. It can be provided that the source for generating polarization-entangled photon pairs is formed as a Sagnac source, and/or a BBO source, and/or crossed crystal source, and/or beam-displacer source, and/or a source based on spontaneous four-wave mixing.

It can be provided that each detection module has optical components for measuring the photons in two non-orthogonal bases. It can be provided that the optical components for measuring the photons have fixed optical components and/or variable optical components. It can be provided that the fixed components are formed as one or more beam splitters and/or polarizing beam splitters and/or wave plates and/or polarizers and/or detectors. It can be provided that the variable optical components are formed as variable wave plates and/or electro-optical modulators and/or variable polarizers.

It can be provided that the detectors are formed as single-photon detectors.

It can be provided that the detection modules communicate the measurement of the photons to a computer or a logic system. The point in time of the measurement of the photon can be communicated, and/or the polarization of the measured photons. It can be provided that each detection module communicate the measurement of the photons in each case to its own computer or its own logic system, in order to obtain, for each detection, a time stamp, the basis in which the measurement was carried out and the measured polarization, wherein, for the determination of the coincidences of the entangled photon pairs, the time stamp and the basis in which the measurements were carried out are exchanged between the computers or logic systems.

It can be provided that the computer or the logic system is connected to the polarization compensation unit. It can be provided that the computer or the logic system reads out and/or controls the retardation d (delay) and/or the voltage applied to one or more of the liquid-crystal retardation plates, and/or the retardation d (delay), and/or degree of squeezing, and/or degree of birefringence, and/or the voltage applied to one or more of the fiber squeezers. It can be provided that, in the case of in each case one computer or in each case one logic system per detection module, only one of the computers or one of the logic systems is connected to the polarization compensation unit and reads it out and/or controls it.

The readout and/or control of the optical components by the computer or the logic system, as well as the communication of the detection modules with the computer or the logic system makes an automated adjustment and stabilization possible.

It can be provided that the computer or the logic system are formed with a microprocessor and a non-volatile memory, wherein the non-volatile memory has an executable program code of a program for carrying out the method according to the invention.

It can be provided that the quantum channels are formed as glass fibers, and/or hollow fibers, and or a free-space optical link.

It can be provided that the device according to one of the preceding embodiment examples for carrying out a method for polarization alignment is formed according to one of the preceding embodiment examples of the method.

By coincidences here are meant the photons of an entangled photon pair, which in the first detection module (recipient 1) have the polarization $p_1$ and in the second detection module (recipient 2) have the polarization $p_2$, $p_1$ and $p_2$ here stand for a polarization, preferably a polarization of the two non-orthogonal bases, for example of the polarizations H, V, D, A. In this example, eight pairings, four correlating and four anti-correlating coincidences, are possible $C_{HH}$, $C_{VV}$, $C_{HV}$, $C_{VH}$, $C_{DD}$, $C_{AA}$, $C_{DA}$, $C_{AD}$.

Correlating here means that there are the largest possible number of coincidences between these detectors, whereas anti-correlating detector pairings have as few coincidences as possible. The choice of the pairings results dynamically during the routine of polarization compensation, as the measured coincidences are set off against each other in a particular manner and provide a single control parameter for controlling the optimization algorithm. This is a particular advantage of the method according to the invention, as four optimal setting possibilities are thereby provided to the optimization algorithm, instead of just one.

The visibility $V_{p1,p2}$ can be calculated from the measured coincidences. As a contrast function, this represents a measure of the quality of the entanglement F (fidelity) in the respective basis. The visibility can adopt values in the interval $[-1, 1]$. For example, for the H/V and D/A bases, the visibility is calculated by $$V_{HV} = \frac{C_{HH} + C_{VV} - C_{HV} - C_{VH}}{C_{HH} + C_{VV} + C_{HV} + C_{VH}} \text{ or } V_{DA} = \frac{C_{DD} + C_{AA} - C_{DA} - C_{AD}}{C_{DD} + C_{AA} + C_{DA} + C_{AD}}.$$

In this embodiment example, correlating pairings are $C_{HH}$ and $C_{VV}$, as well as $C_{DD}$ and $C_{DD}$, which should be correspondingly maximized, whereas the pairings $C_{HV}$ and $C_{VH}$, as well as $C_{DA}$ and $C_{AD}$, represent anti-correlating pairings and should be minimized.

Further valid pairings for generating key pairs are possible, in that the sign is changed selectively or the sign of both formulae is changed at the same time. This results in a particular advantage of the method according to the invention, in that the algorithm dynamically decides which pairings are correlated and which are anti-correlated, with the result that, when this control parameter is utilized, not only one optimal setting exists, but four different ones.

The quality of the entanglement (fidelity) F results from the visibilities $V_H V$ and $V_{DA}$, for example by approximation by $$F = \frac{1}{2}(V_{HV} + V_{DA}),$$

and can adopt values in the interval [0, 1]. In order to freely choose the correlations, the absolute fidelity F* can be chosen as control parameter $$F^* = \frac{1}{2}(|V_{HV}| + |V_{DA}|)$$

with values in the interval [0, 1].

The quantum bit error rate (QBER) can be determined directly from the coincidences as a quotient of the sum of all anti-correlated coincidences in relation to the sum of all coincidences, for example by $$QBER = \frac{C_{HV} + C_{VH} + C_{DA} + C_{AD}}{C_{HH} + C_{VV} + C_{HV} + C_{VH} + C_{DD} + C_{AA} + C_{DA} + C_{AD}}.$$

Correspondingly to the method according to the invention, the QBER can be used as control parameter, as well as a generalized QBER value, which has, in the numerator, the sum of all respective anti-correlated coincidences.

An alternative measure of the QBER is based on the fidelity and is for example determined by $$QBER = \frac{1}{2}(1 - F).$$

It is also possible to use a generalized QBER* with $$QBER^* = \frac{1}{2}(1 - F^*)$$

as control parameter.

BRIEF DESCRIPTION OF THE DRAWINGS

Further embodiments of the invention are represented in the figures and described in the following. In the figures, a possible design of the invention is shown by way of example. This design serves to explain a possible implementation of the invention and is not to be understood to be limitative. There are shown in.

DETAILED DESCRIPTION

Figure 1:
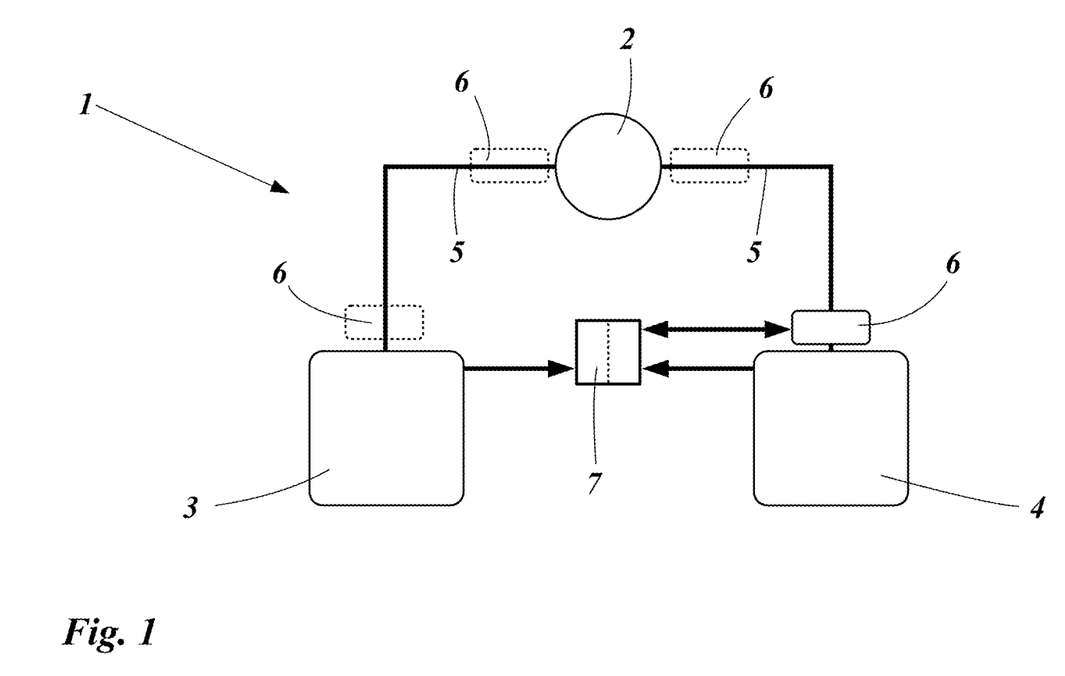
FIG. 1: a schematic representation of a device according to the invention for polarization alignment.

FIG. 1 shows a schematic representation of the device 1 according to the invention for polarization alignment with a source 2, a first detection module 3, a second detection module 4, quantum channels 5 between the source 2 and the detection modules 3 and 4, a polarization compensation unit 6 (continuous line) arranged in one of the quantum channels 5 and a computer 7. The polarization compensation unit 6 with a dashed line represent alternative arrangements of the polarization compensation unit 6.

The source 2 in FIG. 1 is formed as an entangled photon source and in this embodiment example generates polarization-entangled photon pairs with in each case one signal photon and one idler photon. In each case, one photon of each pair is transmitted through the quantum channel 5 to the first detection module 3 and the second photon of each pair is transmitted through the quantum channel 5 to the second detection module 4. The quantum channels 5 are formed as fibers in this embodiment example. Through the transmission of the photons in the quantum channels 5, an unknown polarization rotation occurs.

In order to compensate for the unknown polarization rotation, the polarization compensation unit 6 is arranged in one of the quantum channels 5. Through the use of polarization-entangled photon pairs, it is possible to align the unknown polarization rotation in both quantum channels 5, i.e. the first one between the source 2 and the first detection module 3 and the second one between the source 2 and the second detection module 4. In the process, the polarization bases are aligned with each other by the device 1 of both recipients 3 and 4. To align the polarization between the two detection modules 3 and 4, the polarization compensation unit 6 is arranged in one quantum channel 5. In the embodiment example of FIG. 1, the polarization compensation unit 6 is arranged before the second detection module 4. In the first and second detection modules 3 and 4, the polarization of the polarization-entangled photon pairs is measured and the results are transferred to a logic system 7.

In the embodiment example of FIG. 1, the logic system 7 performs the algorithms according to the invention, in that the logic system 7 obtains and evaluates the measurement results of the first and second detection modules 3 and 4 as indicated in FIG. 1 by the arrows between the first and second detection modules 3 and 4 and the logic system 7, and can read out and set the settings of the components of the polarization compensation unit 6 as indicated in FIG. 1 by the double arrow between the logic system 7 and the polarization compensation unit 6. Thus, the logic system 7 can predefine the settings of the components of the polarization compensation unit 6 under which a measurement of the entangled photon pairs is carried out and reads out the measurement result in the first and second detection modules 3 and 4. The components of the polarization compensation unit 6 can then be set by the logic system 7 using the algorithm, in order to align the polarization change during the transmission of the photons via the quantum channels. In FIG. 1 a logic system 7 is represented, wherein in the case of spatially separated detection modules 3 the measurement of the photons are in each case transferred to their own computer or their own logic system 7, in order to obtain, for each detection module 3 for each detection, a time stamp, the basis in which the measurement was carried out and the measured polarization. This is indicated in FIG. 1, for spatially separated detection modules 3, by the dashed line in the logic system 7. In the case of spatially separated computers or logic systems 7, for the determination of the coincidences of the entangled photon pairs, the time stamp and the basis in which the measurements were carried out are exchanged between the respective computers or logic systems 7.

To set the components of the polarization compensation unit 6, in the embodiment example of FIG. 1 the voltage at liquid-crystal retardation plates can for example be set and read out.

Further exemplary arrangements of the polarization compensation unit 6 are further represented dashed in FIG. 1, i.e. before the first detection module 3 and after the source 2 in the direction of the first and second detection modules 3 and 4. According to the invention, only one polarization compensation unit 6 is formed, wherein the optical components of the polarization compensation unit 6 can be formed in a special arrangement of the polarization compensation unit 6, or the optical components can be allocated to the different positions of the polarization compensation unit 6. During the allocation, however, the number of optical components does not change, only the position of the arrangement differs.

Figure 2:
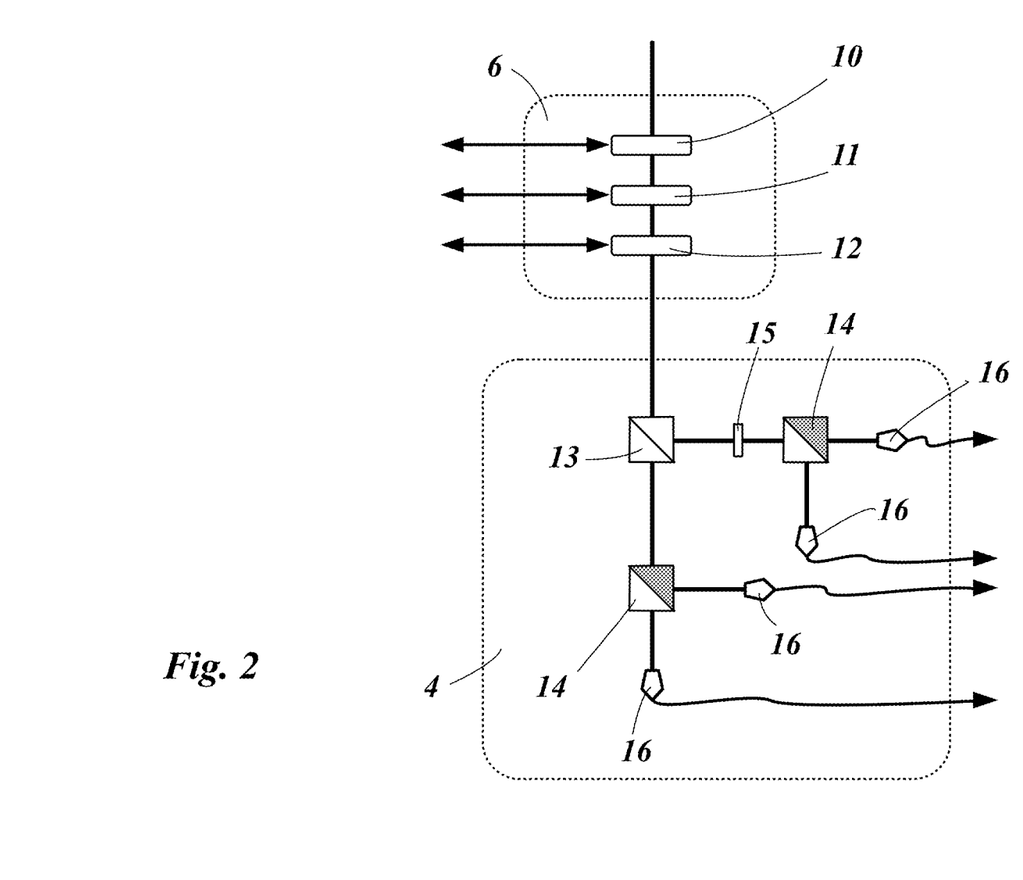
FIG. 2: an embodiment example of the polarization compensation unit and of the detection module.

FIG. 2 shows an embodiment example of the polarization compensation unit 6 and of the second detection module 4 from FIG. 1 in detail. In this embodiment example, the polarization compensation unit 6 consists of three liquid-crystal retardation plates, a first liquid-crystal retardation plate 10, a second liquid-crystal retardation plate 11, and a third liquid-crystal retardation plate 12. The setting of each of the three liquid-crystal retardation plates can be set and read out via the logic system 7 (not represented in FIG. 2), as indicated by the double arrows in FIG. 2.

In the embodiment example of FIG. 2, the fast axes of the first, second and third liquid-crystal retardation plates 10, 11 and 12 are arranged at an angle of 0°, 45° and 0°. 0° means an arrangement of the fast axis relative to the horizontal linear polarization of a polarizing beam splitter before a detector in the second detection module 4.

In the embodiment example of FIG. 2, the second detection module 4 is formed for measuring the polarization of the photons in the H/V and the D/A bases. For this, the second detection module 4 has a beam splitter 13, at which the photons are randomly transmitted or reflected (50/50). The transmitted photons strike a first polarizing beam splitter 14 whereby photons with a horizontal or vertical polarization are measured using the two detectors 16 at the output of the first polarizing beam splitter 14. The reflected photons pass through a half-wave plate 15 at 22.5° whereby a rotation of the linear polarization through 45° is obtained and photons in the diagonal polarization and in the anti-diagonal polarization are measured by the second polarizing beam splitter 14 and the detectors 16 arranged thereafter. When a photon is measured in one of the detectors 16, in the embodiment example of FIG. 2 the detection result is transferred to the logic system 7 (not represented in FIG. 2), as indicated by the arrows starting from the detectors 16.

LIST OF REFERENCE NUMBERS 1 device for polarization alignment
2 source
3 first detection module
4 second detection module
5 quantum channel
6 polarization compensation unit
7 logic system
10 first liquid-crystal retardation plate
11 second liquid-crystal retardation plate
12 third liquid-crystal retardation plate
13 beam splitter
14 polarizing beam splitter
15 half-wave plate
16 detector

What is claimed is:

1. A method for polarization alignment,
comprising a source for generating polarization-entangled photon pairs and two detection modules, wherein the source is connected via in each case one quantum channel for transmitting the photons to the two detection modules, and wherein each detection module measures the polarization of the photons in two non-orthogonal bases, and
comprising a polarization compensation unit for polarization alignment of the polarization change during the transmission of the photons via the quantum channels, wherein the polarization compensation unit comprises several optical components,
wherein the polarization alignment is effected by a downhill simplex algorithm and/or by a deterministic algorithm,
wherein, for the downhill simplex algorithm, control parameters are measured in the detection modules at different settings of the optical components, and using the downhill simplex algorithm the control parameters are minimized and/or maximized, and
the optical components are set by the minimization and/or maximization of the control parameters by the downhill simplex algorithm, in order to align the polarization change during the transmission of the photons via the quantum channels, and/or,
for the deterministic algorithm, control parameters are measured in the detection modules at different settings of the optical components, wherein the different settings of the optical components are predefined by the deterministic algorithm, and
using the measurements the settings of the optical components for polarization alignment are calculated by the deterministic algorithm, and
the optical components are set using the deterministic algorithm, in order to align the polarization change during the transmission of the photons via the quantum channels.

2. The method for polarization alignment according to claim 1,
wherein the polarization compensation unit comprises at least three optical components.

3. The method for polarization alignment according to claim 2, wherein the optical components of the polarization compensation unit are formed as liquid-crystal retardation plates and/or as fiber squeezers.

4. The method for polarization alignment according to claim 1, wherein, for the downhill simplex algorithm and/or deterministic algorithm, it is provided that, as control parameters, the coincidences of the photon pairs are determined and/or the visibility of the photon pairs and/or the fidelity of the photon pairs and/or the rate at which a common key is generated and/or the quantum bit error rate (QBER), or modifications based on such values.

5. The method for polarization alignment according to claim 1, wherein, for the downhill simplex algorithm and/or deterministic algorithm, it is provided that the settings of the liquid-crystal retardation plates as part of the polarization compensation unit for measuring the control parameters is the retardation d (delay) and/or the voltage applied to one or more of the liquid-crystal retardation plates, and/or
wherein the settings of the fiber squeezers as part of the polarization compensation unit for measuring the control parameters is the retardation d (delay), and/or degree of squeezing, and/or degree of birefringence, and/or the voltage applied to one or more of the fiber squeezers.

6. The method for polarization alignment according to claim 3, wherein the liquid-crystal retardation plates and/or fiber squeezers make a retardation d of 0 and $2\pi$ possible.

7. The method for polarization alignment according to claim 1, wherein the method using the downhill simplex algorithm is effected before and/or during the key generation with entangled photons in the case of quantum cryptography (QKD), and/or
wherein the method using the deterministic algorithm is effected before the key generation with entangled photons in the case of quantum cryptography (QKD).

8. The method for polarization alignment according to claim 1, wherein, during error correction in the case of quantum cryptography (QKD), the content of the detected incorrect portions is exchanged and the content of these portions is utilized, together with the number of non-incorrect portions, for the polarization alignment.

9. The method for polarization alignment according to claim 3, wherein the fast axes of the liquid-crystal retardation plates and/or the fiber squeezers are arranged with respect to each other in such a way that the first and second liquid-crystal retardation plates and/or fiber squeezers influence the first basis and the second basis if the voltage of the first or second liquid-crystal retardation plate and/or the fiber squeezers is changed, and wherein the third liquid-crystal retardation plate and/or fiber squeezer influences only the second basis if the voltage of the third liquid-crystal retardation plate and/or the fiber squeezer is changed.

10. The method for polarization alignment according to claim 3, wherein the downhill simplex algorithm minimizes or maximizes the control parameter depending on the retardation d (delay) and/or the voltage of the liquid-crystal retardation plates.

11. The method for polarization alignment according to claim 1, wherein the deterministic algorithm for measuring the control parameters predefines fixed values and/or value ranges for the different settings of the optical components.

12. The method for polarization alignment according to claim 1, wherein the deterministic algorithm has a relationship of the control parameter to the retardation d in the form of a sin(d+b)+c.

13. The method for polarization alignment according to claim 1, wherein the detection modules communicate the measurement of the photons to a computer or a logic system, and
   wherein the computer or the logic system reads out and/or controls the retardation d (delay) and/or the voltage applied to one or more of the liquid-crystal retardation plates, and/or the retardation d (delay), and/or degree of squeezing, and/or degree of birefringence, and/or the voltage applied to one or more of the fiber squeezers.

14. A device for polarization alignment for use for optical communication, quantum cryptography and/or quantum computing, wherein the device has a source, two detection modules and a polarization compensation unit, and wherein the source generates polarization-entangled photon pairs, and wherein each detection module measures the polarization of the photons in two non-orthogonal bases, and wherein, for the transmission of the photons, each detection module is connected via a quantum channel to the source, and wherein the polarization compensation unit comprises at least three optical components in order to align the polarization change during the transmission of the photons via the quantum channels and in order to perform the polarization alignment by a downhill simplex algorithm and/or by a deterministic algorithm, and wherein the optical components are formed as liquid-crystal retardation plates and/or fiber squeezers, and wherein the liquid-crystal retardation plates and/or fiber squeezers are arranged before and/or in each case in one detection module, or are arranged in the source before one or allocated before both quantum channels, or are arranged in each case in one quantum channel, or are arranged allocated to both quantum channels and/or detection modules, and wherein the fast axes of the liquid-crystal retardation plates and/or the fiber squeezers are arranged with respect to each other in such a way that the first and second liquid-crystal retardation plates and/or of the fiber squeezers influence the first basis and the second basis if the voltage of the first or second liquid-crystal retardation plate and/or the fiber squeezers is changed, and wherein the third liquid-crystal retardation plate and/or of the fiber squeezer influences only the second basis if the voltage of the third liquid-crystal retardation plate and/or the fiber squeezer is changed.

* * * * *